(12) United States Patent
Nakamura et al.

(10) Patent No.: US 7,520,528 B2
(45) Date of Patent: Apr. 21, 2009

(54) STEERING WHEEL ASSEMBLY WITH AIRBAG MODULE

(75) Inventors: Kengo Nakamura, Munakata (JP); Akihiro Kobayashi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 190 days.

(21) Appl. No.: 11/604,777

(22) Filed: Nov. 28, 2006

(65) Prior Publication Data

US 2007/0126216 A1 Jun. 7, 2007

(30) Foreign Application Priority Data

Dec. 6, 2005 (JP) .............................. 2005-352198
Dec. 6, 2005 (JP) .............................. 2005-352199

(51) Int. Cl.
  *B60R 21/16* (2006.01)
  *B60R 21/20* (2006.01)
(52) U.S. Cl. .................................... 280/731; 280/728.3
(58) Field of Classification Search ................. 280/731, 280/728.1, 728.2, 728.3, 771, 743.1, 743.2; 180/287; 200/61.54, 61.55
See application file for complete search history.

(56) References Cited

U.S. PATENT DOCUMENTS

| | | | | |
|---|---|---|---|---|
| 5,730,459 | A | * | 3/1998 | Kanda .......................... 280/731 |
| 6,062,595 | A | * | 5/2000 | Ha .............................. 280/731 |
| 6,550,804 | B2 | * | 4/2003 | Burdock ...................... 280/731 |
| 6,695,344 | B2 | * | 2/2004 | Hauer .......................... 280/731 |
| 6,802,531 | B2 | * | 10/2004 | Bohn et al. .................. 280/731 |
| 6,860,508 | B2 | * | 3/2005 | Keutz .......................... 280/731 |
| 6,942,246 | B2 | * | 9/2005 | Hohne et al. ................ 280/731 |
| 7,213,833 | B2 | * | 5/2007 | Amamori .................. 280/728.3 |
| 2002/0135163 | A1 | | 9/2002 | Derrick |
| 2005/0146119 | A1 | * | 7/2005 | Ford et al. ................... 280/731 |
| 2005/0184486 | A1 | * | 8/2005 | Schneider et al. ......... 280/728.2 |
| 2006/0125217 | A1 | * | 6/2006 | Nakamura et al. ........... 280/731 |

FOREIGN PATENT DOCUMENTS

| | | |
|---|---|---|
| DE | 20105002 | 7/2001 |
| EP | 0523882 | 1/1993 |
| EP | 0796756 | 9/1997 |
| EP | 1571032 | 9/2005 |
| WO | WO 99/52761 | 10/1999 |

OTHER PUBLICATIONS

European Search Report, EP06024710, Mar. 19, 2007.

* cited by examiner

*Primary Examiner*—John Q. Nguyen
*Assistant Examiner*—James English
(74) *Attorney, Agent, or Firm*—Studebaker & Brackett PC; Donald R. Studebaker

(57) ABSTRACT

A steering wheel assembly includes an airbag module having an airbag; and a centrally-located steering pad housing said airbag module and includes; a deployment segment located around a peripheral region and adapted to be forcibly displaced by inflation of the airbag; and a stationary segment located in a central region and kept in its fixed state even when the inflation of said airbag. The stationary segment is provided with a manual operation section adapted to be manually operated based on rotational or sliding movements to control an in-vehicle device, wherein said steering pad has a concave portion formed on a surface of the stationary segment; and said manual operation section is disposed within said concave portion in such a manner that a lateral surface of said manual operation section is spaced apart from a lateral wall surface of said concave portion.

27 Claims, 11 Drawing Sheets

STEERING WHEEL ASSEMBLY WITH AIRBAG MODULE

BACKGROUND OF THE INVENTION

1. Field of the Invention

The present invention relates to a steering wheel assembly comprising a centrally-located steering pad which houses an airbag module having an airbag adapted to be inflated during a vehicle collision. More specifically, the present invention relates to a steering wheel assembly comprising a centrally-located steering pad which houses an airbag module and includes a peripheral segment adapted to be forcibly displaced by an airbag during inflation and a central segment adapted to be kept in its fixed state even during the inflation of the airbag.

2. Description of the Related Art

Late years, in vehicles, such as automobiles, one type where an airbag module adapted to inflate an airbag during a vehicle collision so as to protect a driver from a secondary collision is housed in a steering pad of a steering wheel assembly has been increasingly prevalent. For instance, in this steering wheel assembly with an airbag module, a steering pad is designed to have a driver-facing wall (a wall facing a driver seated in a driver's seat) which includes a peripheral segment adapted to be forcibly displaced by an airbag during inflation, and a central segment adapted to be kept in its fixed state even during the inflation of the airbag and provided with an ornamental member and various types of manual operation sections.

US Patent Publication No. 2002/135163 discloses a steering wheel assembly equipped with a so-called doughnut-shaped airbag module, in which an airbag is inflated toward a driver's seat during a vehicle collision while forcibly displacing a peripheral segment of a steering pad and leaving behind a central segment of the steering pad. In the steering wheel assembly, a touch panel serving as a manual operation section for manually controlling an in-vehicle device is mounted on the central stationary segment of the steering pad adapted to be kept in its fixed state even during inflation of the airbag, in such a manner as to largely protrude from a driver-facing wall surface of the steering pad, so that a driver can touch the touch panel to variously control the in-vehicle device.

In the steering wheel assembly disclosed in the above patent publication, a manual operation section is made up of the touch panel. Thus, during operation of the manual operation section, a passenger is required to check respective positions of plural touch switches (fields) in a screen image displayed on the touch panel. Moreover, the screen image is displayed in various patterns, i.e., respective positions of the touch switches (fields) are variously changed, depending stages of a series of touch operations, and therefore the passenger has to look down at the touch panel for each of the touch operations. When the passenger moves his/her glance to the steering wheel in the above manner, he/she hardly recognize outside environments. On the other hand, if the passenger sufficiently pays attention to outside environments, he/she will hardly recognize the touch switch positions to cause a problem about deterioration in operational performance of the manual operation section.

In view of the above circumstances, it is an object of the present invention to provide a steering wheel assembly with an airbag module, capable of achieving enhanced operational performance of a manual operation section for manually controlling an in-vehicle device while suppressing damages of the manual operation section and reducing driver's uncomfortable feeling.

SUMMARY OF THE INVENTION

In order to achieve the above object, the present invention provides a steering wheel assembly comprising an airbag module having an airbag adapted to be inflated during a vehicle collision, and a centrally-located steering pad housing the airbag module. The steering pad includes a deployment segment located around a peripheral region of the steering pad and adapted to be forcibly displaced by the airbag during inflation, and a stationary segment located in a central region of the steering pad and adapted to be kept in its fixed state even during the inflation of the airbag. The stationary segment is provided with a manual operation section adapted to be manually operated based on either one of rotational and sliding movements so as to control an in-vehicle device. The steering pad has a concave portion in at least a surface of the stationary segment which faces a driver seated in a driver's seat, and the manual operation section has a portion disposed within the concave portion in such a manner that a lateral surface of the manual operation section is spaced apart from a lateral wall surface of the concave portion by a distance allowing the lateral surface of the manual operation section to be touched from outside.

In the above steering wheel assembly of the present invention, the manual operation section is designed to be manually operated based on to either one of rotational and sliding movements. Thus, without the need for moving driver's glance to a manual operation section to look for respective positions of bottoms as in the conventional touch panel, a position of the manual operation section adapted to manually control various in-vehicle devices can be figured out based on touch and feel, to allow the manual operation section to be operated while recognizing outside environments so as to provide enhanced operational performance thereto.

The above manual operation section designed to be operated rotationally and/or slidingly is likely to protrude from a portion of the steering pad therearound. In order to avoid this risk, in the present invention, the driver-facing surface of the stationary segment is formed with the concave portion, and the manual operation section has a portion disposed within the concave portion. This makes it possible to reduce or eliminate a protrusion of the manual operation section relative to the steering pad so as to reduce or eliminate driver's oppressed feeling, i.e., uncomfortable feeling, and to reduce or eliminate an obstructive protrusion so as to ensure a smooth steering operation.

In the above manual operation section designed to have a portion disposed within the concave portion, if the concave portion is deformed to reduce an area of the opening thereof during the inflation of the airbag, the steering pad is likely to interfere with the manual operation section and cause damages of the manual operation section. In order to avoid this risk, the manual operation section is designed to be manually operated based on either one of rotational and sliding movements, and to have a portion disposed within the concave portion in such a manner that the lateral surface of the manual operation section is spaced apart from the lateral wall surface of the concave portion by a distance allowing the lateral surface of the manual operation section to be touched from outside. The distance between the lateral surface of the manual operation section and the lateral wall surface of the concave portion makes it possible to provide enhanced operational performance and effectively suppress damages of the manual operation section due to interference with the steering pad caused by deformation in the steering pad during the inflation of the airbag. That is, in view of the arrangement of the manual operation section allowing the driver to touch the lateral surface of the manual operation section, the lateral surface of the manual operation section and the lateral wall surface of the concave portion has to be spaced apart from each other by a sufficient distance to a deformation of the concave portion during the inflation of the airbag. This distance can be used as an allowance during deformation of the stationary segment during the inflation of the airbag so as to effectively prevent damages and deformation in the manual operation section.

These and other objects, features, and advantages of the present invention will become apparent upon reading the following detailed description along with the accompanied drawings.

DETAILED DESCRIPTION OF THE PREFERRED EMBODIMENTS OF THE INVENTION

Figure 1:
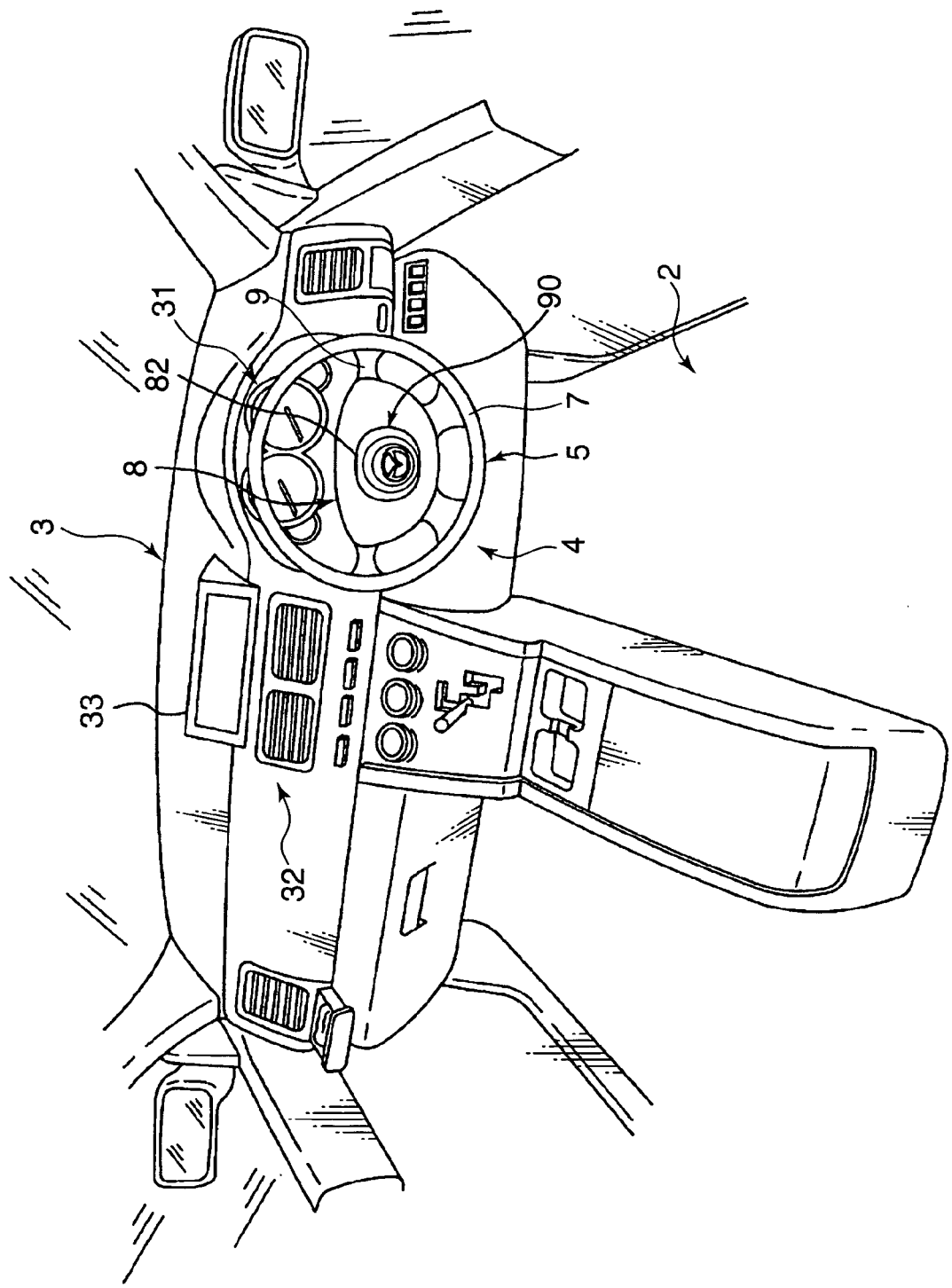
FIG. 1 is a schematic diagram showing a front structure of a passenger compartment provided with a steering wheel assembly according to one embodiment of the present invention.

With reference to the drawings, a preferred embodiment of the present invention will now be described. FIG. 1 is a schematic diagram showing a front structure of a passenger compartment provided with a steering wheel assembly according to one embodiment of the present invention.

A dash panel (not shown) is arranged in the front of the passenger compartment in such a manner as to extend vertically and continuously from a floor panel 2 serving as a floor surface of the passenger compartment, and an instrument panel 3 is fixed to a surface of the dash panel on the side of the rear of a vehicle. This instrument panel 3 is equipped with various types of meters 31, an air-conditioning unit 32, a display 33 of a navigation unit, etc. Further, on the side of a driver's seat opposed to the meters 31, the instrument panel 3 is equipped with a steering apparatus 4 for steering the vehicle.

Figure 2:
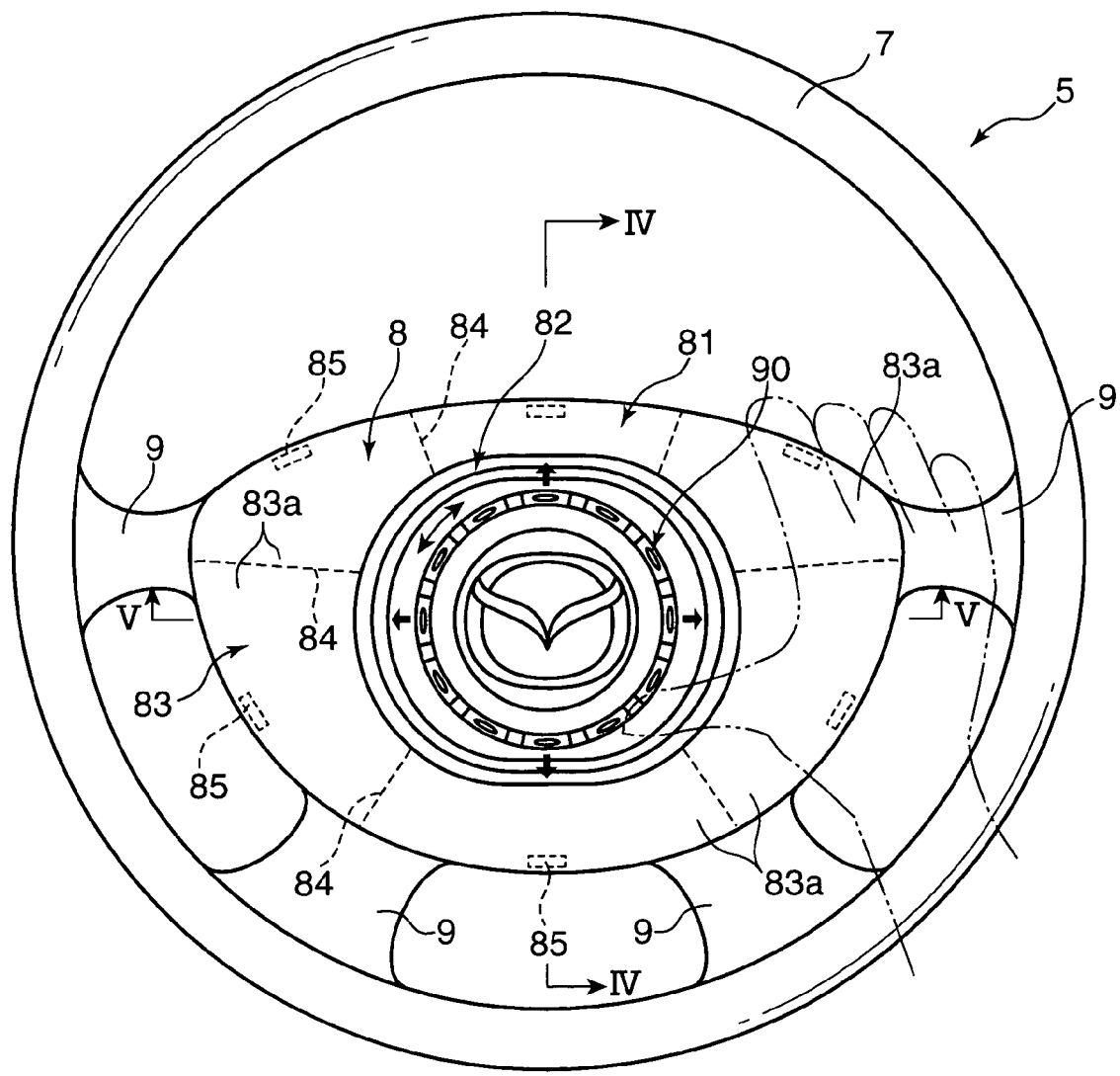
FIG. 2 is an enlarged front view showing the steering wheel assembly.

The steering apparatus 4 comprises a steering wheel assembly 5 to be operated by a driver seated in the driver's seat. When the steering wheel assembly 5 is rotationally operated, the resulting steering force is transmitted to an axle through a steering shaft 51 (see FIG. 4), a gearbox (not shown) and a linkage (not shown). FIG. 2 is an enlarged front view showing the steering-wheel assembly.

Figure 3:
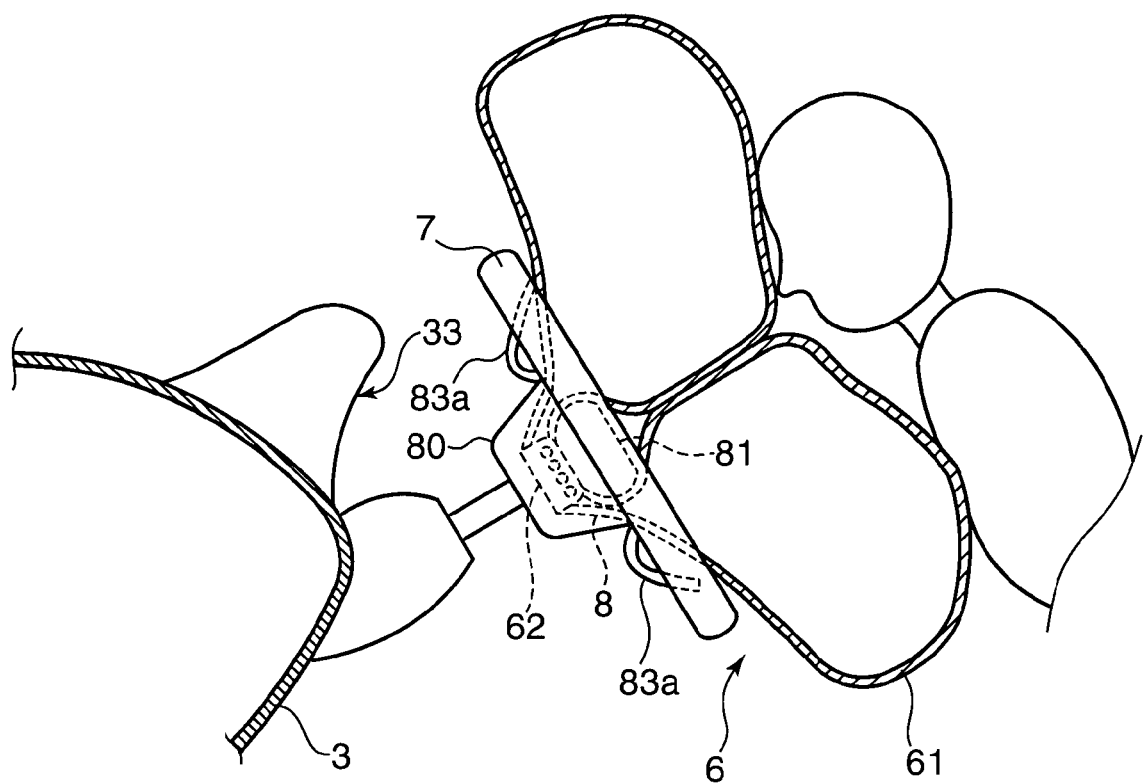
FIG. 3 is an explanatory diagram showing the steering wheel assembly in a state after an airbag is deployed.

This steering wheel assembly 5 includes an airbag module 6 which has an airbag 61 adapted to be inflated and deployed, as shown in FIG. 3, by gas supplied from an inflator 62 when a vehicle collision is detected by a collision sensor (not shown), so as to protect a passenger (driver) from a secondary collision. The airbag module 6 is made up of the airbag 61, and inflator 62 for inflating the airbag 61.

Figure 4:
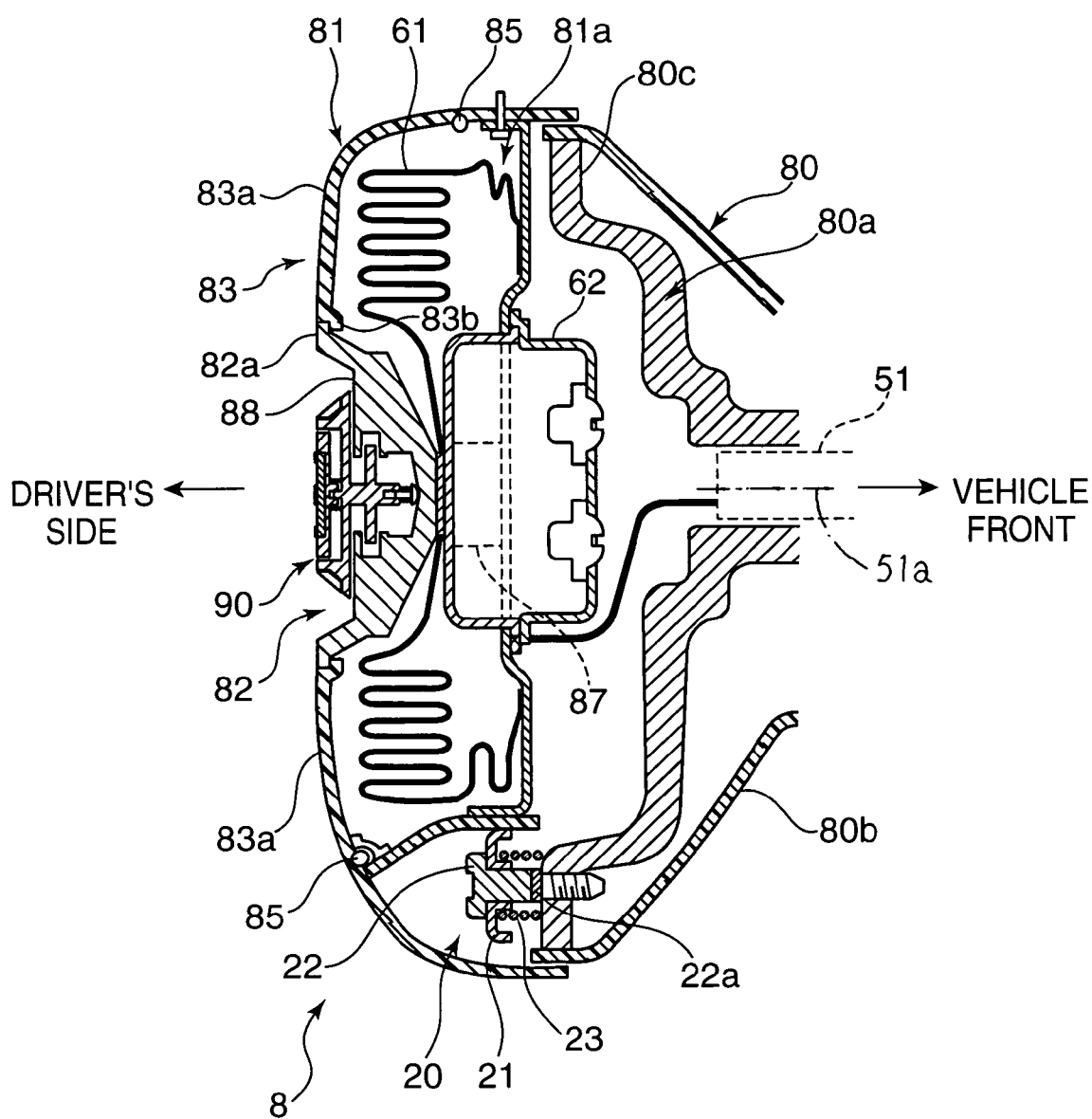
FIG. 4 is a sectional view taken along the line IV-IV of FIG. 2.

Specifically, as shown in FIG. 2, the steering wheel assembly 5 comprises a circular ring-shaped steering ring 7 adapted to gripped by the driver, a steering pad 8 disposed in an approximately central region of the steering ring 7, and a spoke 9 connecting between the steering ring 7 and the steering pad 8. As shown in FIG. 4, the steering wheel assembly 5 is connected to the steering shaft 51 by the steering pad 8. In this embodiment, the steering ring 7 is supported by the steering pad 8 through four of the spokes 9, and the airbag module 6 is housed in the steering pad 8. The number of spokes 9 for supporting steering ring 7 relative to the steering pad 8 is not limited to a specific value, but may, for example, be three.

Each of the steering ring 7 and the spokes 9 is formed by coating a core member having a given shape, with a covering layer made of a synthetic resin, such as urethane.

The steering pad 8 is made of a synthetic resin, such as polypropylene-based resin or polyethylene-based resin, and formed in an approximately inverted trapezoid shape in front view (viewed from the driver). The steering pad 8 comprises a base 80 (see FIG. 4) adapted to be fixed to the steering shaft 51, a deployment segment 81 located on the side of the driver relative to the base 80 and around a peripheral region of the steering pad 8, and a stationary segment 82 located in a central region of the deployment segment 81. The airbag adapted to be inflated in a doughnut shape is stored in the deployment segment 81, in a folded state.

As shown in FIG. 4, the base 80 is formed in a funnel shape, and fixed to an end of the steering shaft 51. The base 80 comprises a core member 80a which is formed to have a large opening on the side of the driver and a flange 80c extending outward from a peripheral edge of the opening, and a trim member 80b covering the core member 80a. The base 80 holds the deployment segment 81 and a stationary segment 82 in such a manner that they are displaceable relative to each other along an axial direction of the steering shaft 51 (i.e., along a steering axis 51a), and biased toward the driver through a horn switch 20.

The horn switch 20 comprises a contact member 21 fixed to the deployment segment 81, a guide shaft 22 which extends upright from the flange 80c of the core member 80a to guide the contact member 21 therealong, and has a base end portion provided with a conducting terminal 22a adapted to selectively come into contact with the contact member 21, and a bias member 23 biasing the contact member 21 in a direction away from the conducting terminal 22a. When the steering pad 8 (more specifically, the deployment segment 81 and the stationary segment 82) is pushed from the side of the driver, the contact member 21 is moved along the guide shaft 22 against an elastic force of the bias member 23, and brought into contact with the conducting terminal 22a to generate a horn.

The deployment segment 81 is attached to (or engaged with) the stationary segment 82 through an approximately central region thereof, and the airbag folded in a compact size is stored or contained in a peripheral region of the deployment segment 81. During inflation of the airbag 61, an after-mentioned cover 83 provided in the peripheral region of the deployment segment 81 is displaced.

Figure 5:
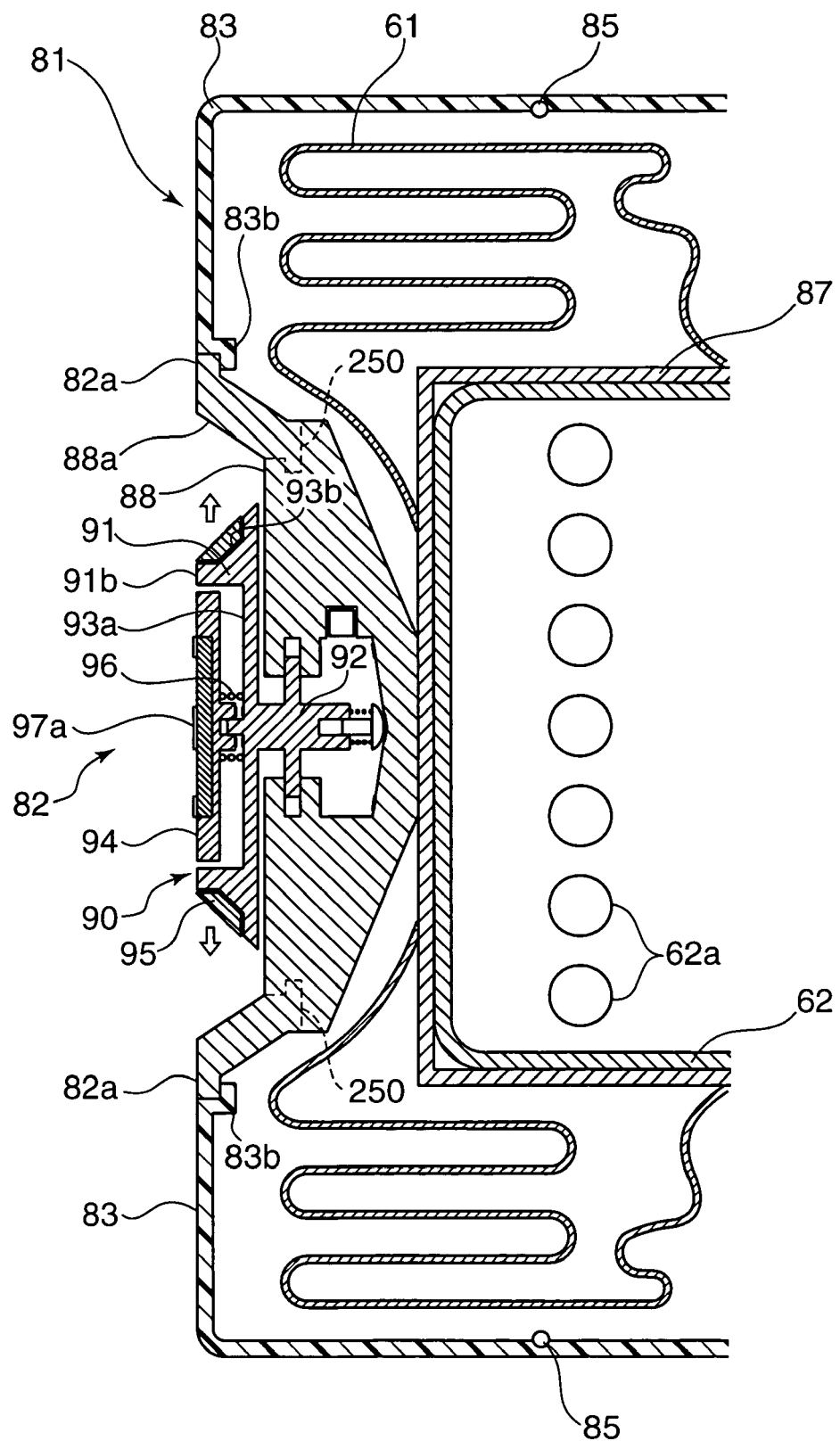
FIG. 5 is a sectional view taken along the line V-V of FIG. 2.

More specifically, as shown in FIG. 5, the inflator 62 of the airbag module 6 is fixedly arranged on a frontward side of the central region of the deployment segment 81 in such a manner that a plurality of gas injection ports 62a of the inflator 62 are in communication with the inside of the airbag 61. The inflator 62 has an angular C-shaped support bracket 87 extending thereacross. The support bracket 87 is provided as a means to support the stationary segment 82. The peripheral region of the deployment segment 81 includes a hollowed space formed to serve as an airbag storage space 81a for storing therein the airbag 61, and a cover 83 designed to be split along a breakable portions 84 (see FIG. 2) by the airbag 61 during the inflation and rotationally displaced about hinges 85 so as to allow the airbag 61 to be inflated and deployed.

The airbag storage space 81a is defined to have a doughnut shape surrounding the stationary segment 82. The stationary segment 82 is formed in an approximately trapezoid shape in section, having a diameter which gradually decreases toward the frontward direction of the vehicle, as described in detail later. Thus, the airbag storage space 81a extends up to a frontward edge of an outer surface of the stationary segment 82, i.e., a position of a connection between the inflator 62 and the stationary segment 82. The airbag storage space 81a extending up to the frontward edge of the stationary segment 82 makes it possible to reduce an area occupied by the steering pad 8 in front view.

As shown in FIG. 2, the cover 83 is formed to define a wall surface of the deployment segment 81 on the side of driver, and disposed to surround the stationary segment 82. Each of the breakable portions 84 is formed as a groove, and adapted to be relatively easily broken by an external force applied thereto from the side of the airbag storage space 81a. In this embodiment, the breakable portion 84 is formed along a line extending radially from the center of the stationary segment 82, and the hinges 85 is disposed, respectively, at positions on opposite sides of the breakable portion 84 and along an outer periphery of the deployment segment 81, to allow respective split portions 83a of the cover 83 broken along the breakable portion 84 to be rotationally displaced thereabout toward the driver and then toward an outside of the steering pad 8. As is clear from FIG. 5, the cover 83 has an inner peripheral edge formed in a hook-like shape in section having a depression on the side of the driver. This hook-like engagement portion 83b is formed to be engageable with an after-mentioned engagement flange 82a of the stationary segment 82.

Figure 6:
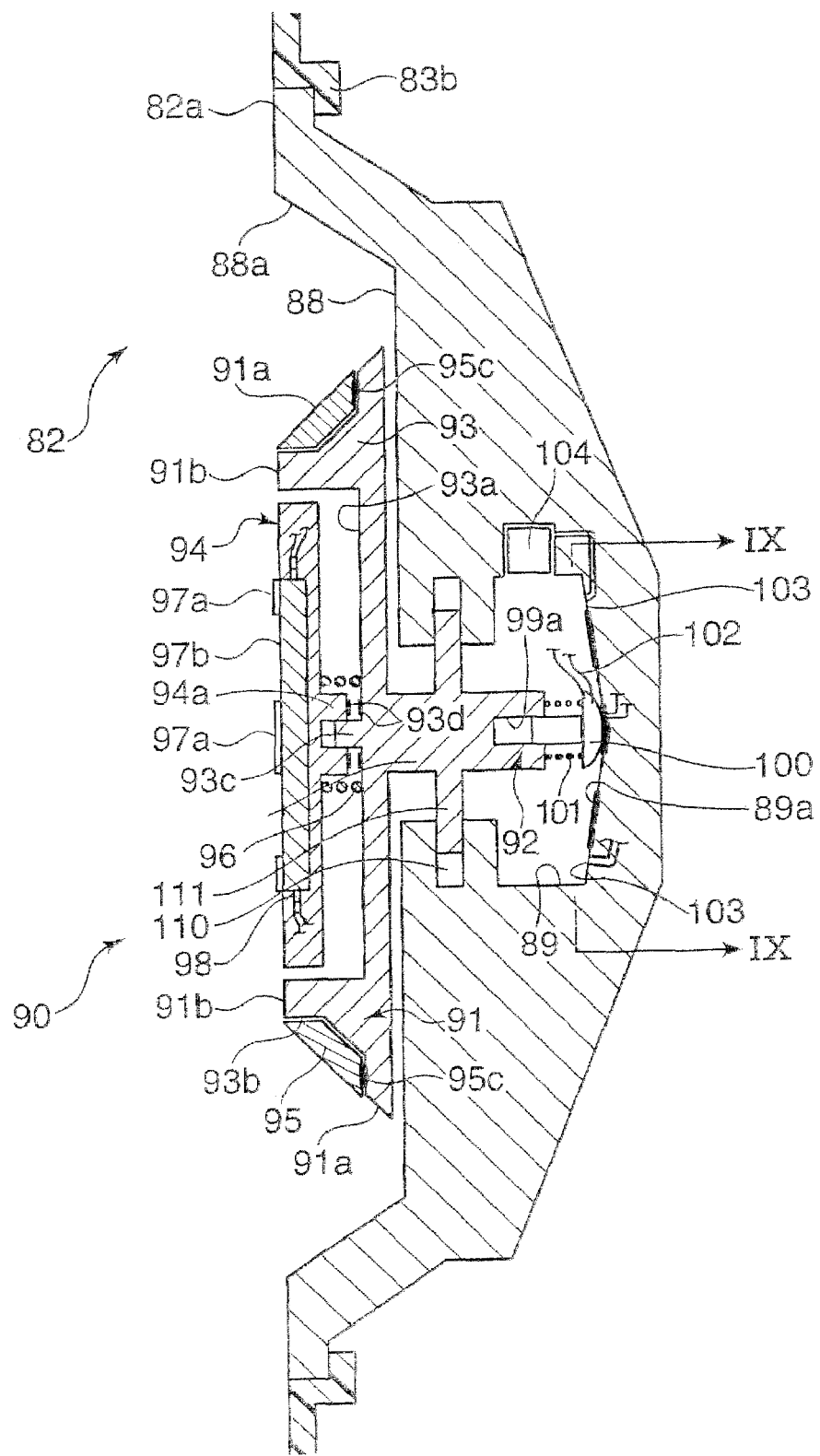
FIG. 6 is a fragmentary enlarged sectional view showing a stationary segment in FIG. 5.

The stationary segment 82 is designed to be kept in its fixed state even during the inflation of the airbag 61. As shown in FIG. 4, the stationary segment 82 is formed in an approximately trapezoid shape having a diameter which gradually decreases toward the frontward direction of the vehicle, so as to prevent a volume of the airbag storage space from being excessively reduced. The stationary segment 82 has a lateral wall extending toward the driver, and an engagement flange 82a extending outward from an edge of the lateral wall. The stationary segment 82 is mounted on the support bracket 87 through a bottom (frontward edge) thereof while allowing an edge of the engagement flange 82a to be engaged with the engagement portion 83 of the deployment segment 81. FIGS. 5 and 6 are enlarged sectional views showing the stationary segment 82.

The stationary segment 82 has a concave portion 88 depressed in the frontward direction of the vehicle. The concave portion 88 is formed in approximately entirety of a surface of the stationary segment 82 which faces the driver (driver-facing surface of the stationary segment 82). The concave portion 88 is formed to have an approximately circular shape in front view, and a depth of 5 mm or more. The concave portion 88 has a lateral wall surface (peripheral wall surface) formed as an inclined surface which is inclined outward toward an opening edge thereof. A manual operation section 90 capable of manually controlling an in-vehicle device is disposed within the concave portion 88. More specifically, approximately an entirety of an after-mentioned plate-shaped touch mechanism 91 of the manual operation section 90 is disposed within the concave portion 88. The manual operation section 90 has a surface facing the driver (driver-facing surface), which is dimensionally set to be approximately flush with the steering pad 8, more specifically, (a topmost portion of) the driver-facing surface of the stationary segment 82.

The manual operation section 90 is designed to be manually operated based on rotational movement and vertical/horizontal sliding (i.e., shifting) movement, so as to control an in-vehicle device (in this embodiment, selectively control a selective parameter indicated on the display 33 of the navigation unit. For example, the manual operation section 90 may be designed to be rotationally operated so as to sequentially change a target item (parameter) indicated on a menu image screen, and slidingly operated so as to move a pointer indicated on a screen of the display 33.

Specifically, the manual operation section 90 comprises a plate-shaped touch mechanism 91 disposed to allow one circular-shaped surface to face the driver, and adapted to be touched by the driver, and a manual operation shaft 92 protruding from a back surface of the plate-shaped touch mechanism 91 along the steering axis. The driver can perform a selection operation by touching only a lateral surface of the plate-shaped touch mechanism 91 and rotating an after-mentioned dial switch 95 of the plate-shaped touch mechanism 91, or by sliding the entire plate-shaped touch mechanism 91 vertically and/or horizontally.

The plate-shaped touch mechanism 91 is a plate shape which is formed to have a size less than that of the concave portion 88, and to allow a driver having a standard physique to touch it. More specifically, the plate-shaped touch mechanism 91 is disposed within the concave portion 88 in such a manner that the lateral surface of the plate-shaped touch mechanism is spaced apart from the lateral wall surface of the concave portion 88 by a distance allowing a finger of the driver to be inserted between the lateral surface of plate-shaped touch mechanism 91 and the lateral wall surface of the concave portion 88. This distance is set at a value not only allowing insertion of driver's finger but also allowing the plate-shaped touch mechanism 91 to be moved within the concave portion 88 during the vertical/horizontal sliding operation. Further, the lateral surface of the plate-shaped touch mechanism 91 is formed as an inclined touch surface 91a which is inclined inward toward the driver-facing surface of the plate-shaped touch mechanism 91, so as to allow the driver to touch the lateral surface of the plate-shaped touch mechanism 91 easily and reliably to perform the operation.

More specifically, as shown in FIGS. 5 and 6, the plate-shaped touch mechanism 91 comprises a main body 93, a push switch 94 and a dial switch 95. The main body 93 has a driving-facing surface formed with a push-switch receiving depression 93a in an approximately central region thereof, and an outer peripheral surface formed with a dial-switch receiving depression 93b. The push switch 94 is received in the push-switch receiving depression 93a and adapted to be moved relative to the main body 93 along the steering axis. The dial switch 95 is received in the dial-switch receiving depression 93b and adapted to be rotated relative to the main body 93.

For example, the push switch 94 serves as a selection button for a selective parameter indicated on the display 33.

As best shown in FIG. 6, a boss 94a is formed on a back surface of the push switch 94, and fitted on a protruding shaft 93c protruding toward the center of the push-switch receiving depression 93a, slidably along the steering axis. Although not illustrated, a stopper is provided at a given position of the push switch 94 to prevent the protruding shaft 93c from being pulled out of the boss 94a.

The push switch 94 is biased toward the driver by an elastic member 96, and adapted to be pushed and moved along the steering axis against an elastic force of the elastic member 96. A bottom surface of the boss 94a and an opposed portion of a bottom surface of the push-switch receiving depression 93a are provided, respectively, with a pair of contact elements 93d adapted to selectively come into contact with each other. These contact elements 93a are brought into contact with each other according to the push operation. Then, in response to contact between the contact elements 93a, a given selection signal is transmitted to a control unit of an in-vehicle device (not shown).

The push switch 94 is biased toward the driver by an elastic member 96, and adapted to be pushed and moved along the steering axis against an elastic force of the elastic member 96. A bottom surface of the boss 94a and an opposed portion of a bottom surface of the push-switch receiving depression 93a are provided, respectively, with a pair of contact elements 93d adapted to selectively come into contact with each other. These contact elements 93a are brought into contact with each other according to the push operation. Then, in response to contact between the contact elements 93a, a given selection signal is transmitted to a control unit of an in-vehicle device (not shown).

The push switch 94 is formed in a disk shape which has a surface facing to the driver (driving-facing surface) with an area less than that of a palm of a driver having a standard physique. For example, the driving-facing surface of the push switch 94 is formed to have a diameter of 7 cm or less. The push switch 94 is disposed to be approximately flush with or depressed relative to the driver-facing surface of the plate-shaped touch mechanism 91. Thus, when the driver pushes the steering pad 8 by his/her palm, the pushing force of the driver is applied to a bank 91b (topmost portion of the driver-facing surface) of the plate-shaped touch mechanism 91 around the push-switch receiving depression 93a, while being hardly applied to the push switch 94. This makes it possible to effectively avoid an undesirable situation where, during a push operation for the horn switch 20, the push switch 94 is erroneously pushed or both the push switch 94 and the horn switch 20 are erroneously pushed.

Further, an ornamental plate 97 (equivalent to an ornamental member) is fitted into a central region of the press switch 94 to provide enhanced aesthetic appearance. This ornamental plate 97 is formed of a translucent member, such as a transparent or semi-transparent plate, for example, an acrylic plate. The ornamental plate 97 is provided with a mask element 97b having a front surface coated with light-blocking paint to allow only an unmasked region 97b, i.e., having no mask element 97b, to be illuminated by an after-mentioned light source 98 (equivalent to illumination means). For example, the unmasked region 97b may be formed in conformity to a shape of a given emblem to provide enhanced aesthetic appearance of the push switch 94.

Figure 7:
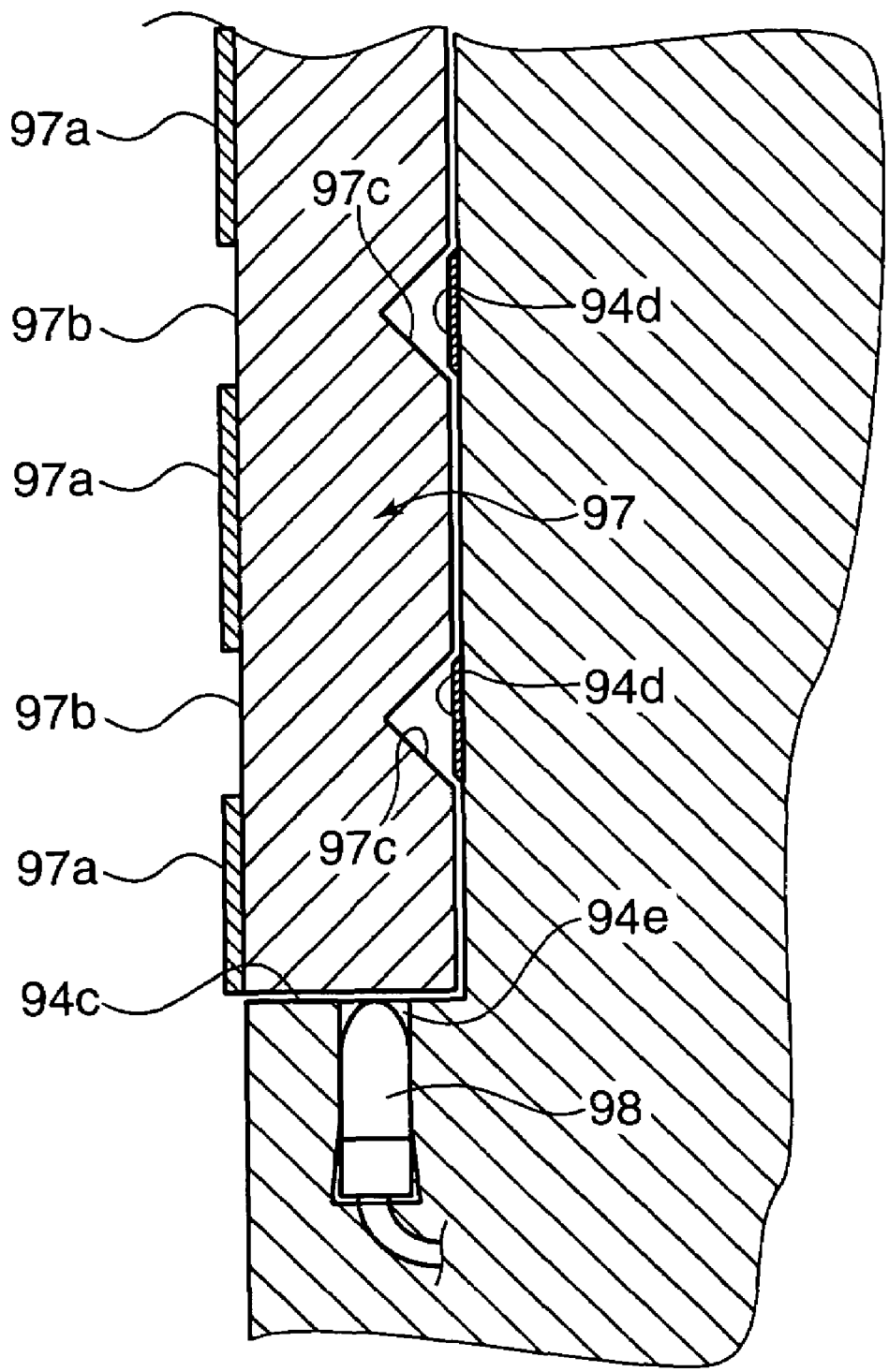
FIG. 7 is an enlarged sectional view showing a light source in FIG. 6 and its surrounding.

As best shown in FIG. 7, in the ornamental plate 97, a plurality of V-shaped grooves 97c are formed in a back surface of the unmasked region 97b to facilitate diffuse reflection of light from the light source 98. Further, in a depression 94c formed in the push switch 94 to receive therein the ornamental plate 97 in a fitting manner, a region of a bottom surface of the depression 94c opposed to each of the grooves 97c is coated with white or silver paint to form a reflection element 94d for diffusely reflecting light from the light source 98.

Figure 8:
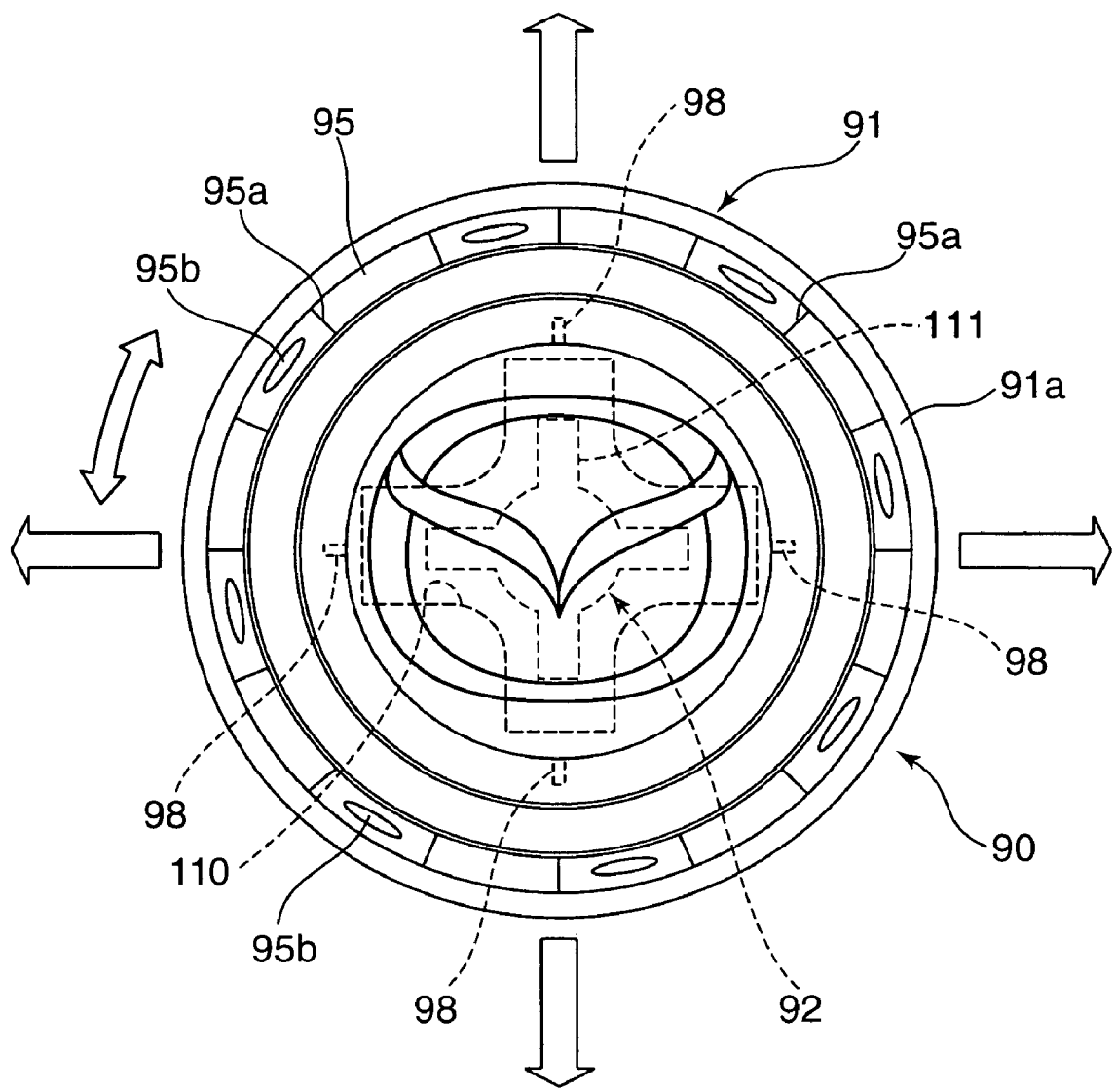
FIG. 8 is a front view showing a manual operation section.

In this embodiment, the light source 98 is composed of an LED (Light-Emitting Diode), and disposed in a receiving hole 94e formed in a lateral wall surface of the depression 94c. Further, in this embodiment, as shown in FIG. 8, four light sources 98 is arranged, respectively, at upper, lower, right and left positions of the depression 94c in front view. Thus, each light emitted from the light sources 98 is diffusedly reflected by the reflection elements 96d and the grooves 97c to illuminate the unmasked region 97b by indirect illumination. For example, the light sources 98 are designed to be turned on in conjunction with a room light, side lamps (width indicators) or headlights. In the embodiment illustrated in FIG. 7, a region of the driver-facing surface of the push switch 94 corresponding to a region of the bottom surface of the depression 94c except for the reflection elements 94d may be coated with dark color paint, such as black paint, to omit the mask element 97a.

The dial switch 95 is formed in a ring shape, and designed to be supported by a ball bearing (not shown) which is almost embedded in the plate-shaped touch mechanism 91 while keeping in contact with a back surface of the dial switch 95, so as to be manually rotated about a rotation axis parallel to the steering axis. The dial switch 95 is received in the dial-switch receiving depression 93b, and a front surface (driver-facing surface) of the dial switch 95 forms a part of the inclined touch surface 91a. The front surface of the dial switch 95a is formed with a plurality of thin grooves extending in a radial pattern, and a plurality of finger engagement portions 95b, such as spherical concave portions, at given intervals, to facilitate engagement between driver's finger and the front surface.

The dial switch 95 has a frontward surface provided with a plurality of magnets (not shown) arranged in a ring shape while alternating their N-pole and S-pole. Further, a magnetic field detector 95c comprising a hall element is provided in a lateral surface of the dial-switch receiving depression 93b of the main body 93 at a given position opposed to the frontward surface of the dial switch 95. The magnetic field detector 95c is operable to detect a magnetic field which is changed in response to the rotation of the dial switch 95, and send a given signal to a control unit (not shown). Then, based on the received signal, the control unit is operable to change a selective parameter on the screen of the display 33.

As shown in FIGS. 6 and 8, the manual operation shaft 92 is formed as a cylindrical-shaped member having an axis parallel to the steering axis, and integrally formed with the main body 93 to extend from an approximately central region of the back surface of the main body 93. The manual operation shaft 92 is inserted into a bottomed manual operation guide hole 89 formed in the bottom surface of the concave portion 88 of the stationary segment 82 to control a sliding direction and amount of the manual operation section 90. Specifically, as best shown in FIG. 8, the manual operation shaft 92 has an axially intermediate portion formed as a cross-shaped control wing member 111. The control wing member 111 is loosely fitted into a cross-shaped positioning hole 110 formed in an appropriate position of a vertical inner surface of the manual operation guide hole 89, to prevent the entire the manual operation section 90 from being pulled out and rotated, and maintain an adequate posture of the manual operation section 90. The manual operation shaft 92 also includes a shaft body 88 and a control pin 100. The shaft body 88 has a pin insertion hole 99a formed in a frontward end thereof to extend axially. A shank of the control pin 100 is inserted into the pin insertion hole 99a, and the control pin 100 is urged against the bottom surface of the manual operation guide hole 89 by a bias member 101. A movement of the shaft body 88 along the steering axis is restricted by a stopper (not shown). The control pin 100 has an end formed in a hemispherical shape. Further, The control pin 100 is formed as an electrically conductive member, and connected with one end of a wiring 102 constituting a given circuit.

Figure 9:
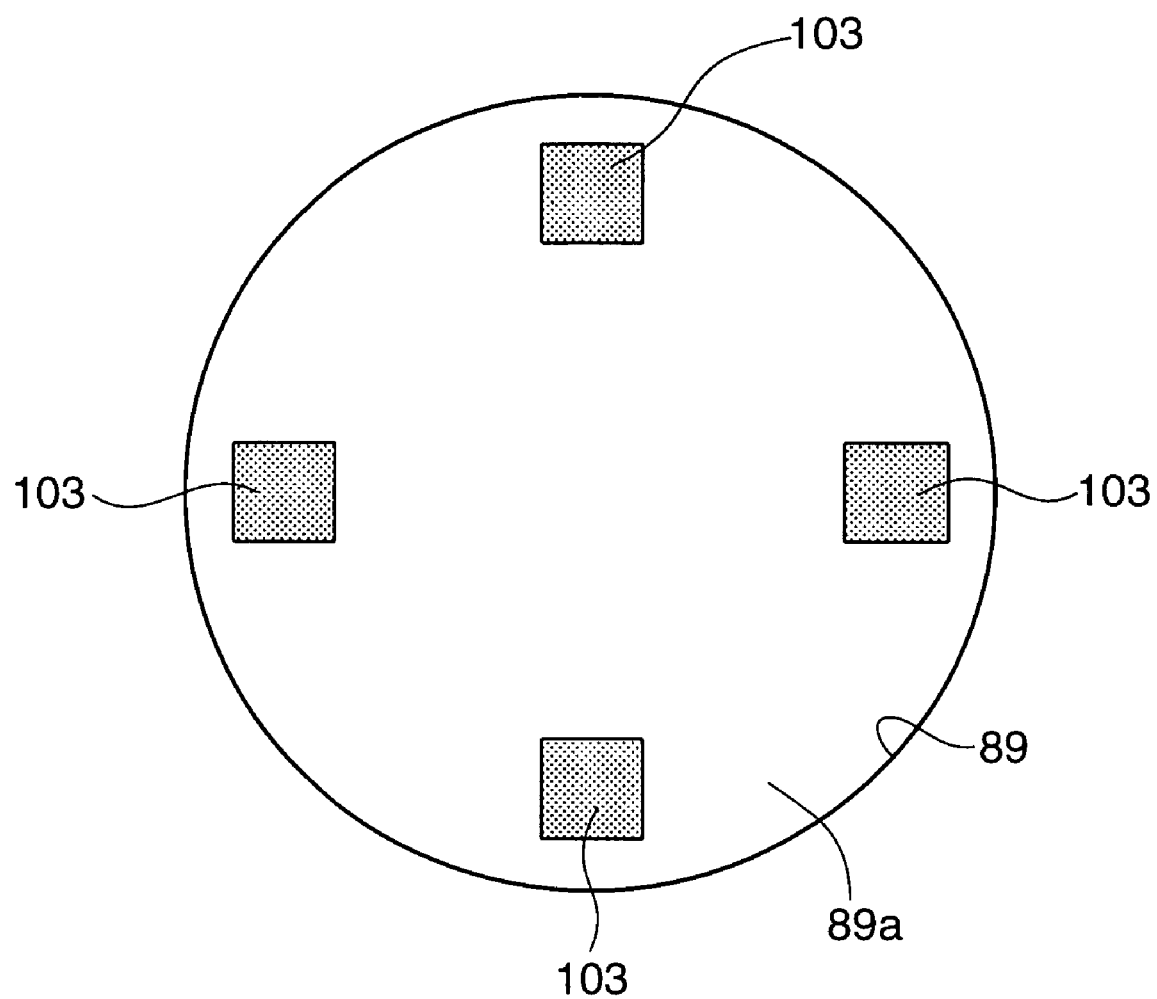
FIG. 9 is an explanatory diagram showing a bottom surface of an operation guide hole.

As mentioned above, the manual operation shaft 92 is inserted into the manual operation guide hole 89. As best shown in FIGS. 6 and 9, the bottom surface of the manual operation guide hole 89 is formed as an inclined guide surface 89a having a depth which increases toward a center thereof, and provided with a sliding-movement contact 103 adapted to come into contact with the control pin 100 in response to the vertical/horizontal sliding movement of the manual operation section 90 in accordance with the cross-shape of the positioning hole 110, to form a closed circuit. Thus, when the driver touches the manual operation section 90 to slide the manual operation section 90 vertically and/or horizontally, the manual operation shaft 92 is also moved along the manual operation guide hole 89, and the control pin 100 is brought into contact with the sliding-movement contact 103 to form a closed circuit so as to perform a given control. Then, when the driver releases the manual operation section 90, the control pin 100 biased toward the inclined guide surface 89a, i.e., the bottom of the manual operation guide hole 89, allows the manual operation shaft 92 to be automatically moved along the inclined guide surface 89a. In other words, the control pin 100 allows the manual operation section 90 to be automatically moved to the center of the manual operation guide hole 89, i.e., a neutral position. Each wiring necessary for the manual operation section 90, such as the control pin 100 and the sliding-movement contact 103, are connected to a centralized distributor 104 housed in the manual operation guide hole 89. The centralized distributor 104 is connected to one or more given control units (not shown), and operable to send a signal from the manual operation section 90 and others to each of the control units.

In the above steering wheel assembly with the airbag module, the stationary segment 82 is kept in the fixed state relative to the base 80 through the deployment segment 81. Thus, the manual operation section 90 for selectively controlling a selective parameter indicated on the screen of the display 33 can be provided on the stationary segment 82.

As shown in FIG. 2, for the rotational operation of the manual operation section 90, the driver stretches his/her first finger (thumb) placed on the steering ring 7 and attaches the finger on the inclined touch surface 91a of the plate-shaped touch mechanism 91. Then, the driver can rotate the dial switch 95 clockwise or counterclockwise by the finger to readily perform the rotational operation of the manual operation section 90. In the same manner, for the sliding operation of the manual operation section 90, the driver attaches the finger on the inclined touch surface 91a of the plate-shaped touch mechanism 91 at a position opposite to an intended sliding direction, and can move the finger in the sliding direction to readily perform the sliding operation of the manual operation section 90. Then, after selecting a selective parameter on the screen of the display 33 according to the above operation, the selected parameter can be set up by pushing the push switch 94 to execute a given processing in the control unit (not shown) of the navigation unit.

During the above operation, the lateral surface of the manual operation section 90 is disposed spaced apart from the inclined surface of the concave portion 88a of the stationary segment 82. Thus, the finger can be readily inserted into the space between the lateral surface of the manual operation section 90 and the lateral wall surface of the concave portion 88a to provide enhanced operational performance in the rotational/sliding operations. Further, the manual operation section 90 is arranged within the concave portion in a protruding manner. This makes it possible to recognize the position of the manual operation section 90 by touch and feel so as to allow these operations to be performed while looking at the display 33 mounted on the instrument panel 3. Thus, the navigation unit can be operated while recognizing outside environments, without the need for moving driver's glance downward to operate a manual operation section.

Further, the manual operation section 90 has the plate-shaped touch mechanism 91 which can be formed in a relatively large size as compared with a rod-shaped member. This makes it possible to readily figure out the position of the manual operation section 90 by touch and feel. In addition, the plate-shaped touch mechanism 91 may be formed in a relatively large size to allow a driver gripping the steering ring 7 to touch the plate-shaped touch mechanism 91 without largely stretching his/her hand. This can provide enhanced operational performance to the manual operation section 90.

Further, the manual operation section 90 is approximately fully received in the concave portion 88 of the stationary segment 82 in such a manner that the driver-facing surface of the manual operation section 90 is flush with (the topmost portion of) the driver-facing surface of the stationary segment 82. This makes it possible to eliminate a protrusion of the manual operation section 90 relative to the driver-facing surface of the steering pad 8 so as to eliminate driver's oppressed feeling, i.e., uncomfortable feeling. In addition, no protrusion of the manual operation section 90 relative to the steering pad makes it possible to avoid an undesirable situation where the manual operation section 90 interferes with driver's hand during a steering operation to hinder the steering operation, so as to allow the driver to smoothly perform the steering operation. Furthermore, a distance between the driver-facing surface of the manual operation section 90 and a driver seated on a driver's seat can be maintained at an adequate value.

In view of allowing the plate-shaped touch mechanism 91 to be approximately fully received in the concave portion 88, the plate-shaped touch mechanism 91 is preferably formed to have a relatively small thickness. In this case, an area of the lateral surface of the plate-shaped touch mechanism 91 is reduced, which is likely to cause deterioration in operational performance. In the steering wheel assembly according to the above embodiment, the lateral surface of the plate-shaped touch mechanism 91 is formed as the inclined touch surface 91a. Thus, the plate-shaped touch mechanism 91 can be formed in a thin shape while ensuring a touch area by the inclined touch surface 91a, to ensure adequate operational performance of the manual operation section 90.

For example, when a front impact collision is detected by a collision sensor (not shown) arranged at a given position of the front of a vehicle body, a detected collision signal is sent to the inflator 62, and inert gas is discharged from the inflator 62. The airbag 61 is inflated by the charged inert gas, and deployed toward a driver opposed to the steering wheel assembly 5 after breaking the breakable portions of the deployment segment 81 and displacing the parts 83a of the cover 83. The engagement portion 83a of each of the parts 83a is moved across the engagement flange 82a of the stationary segment 82 to allow the parts to be rotated and opened. Further, the airbag storage space 81a extends up to the frontward edge of the stationary segment 82. Thus, during the inflation of the airbag 61, the stationary segment 82 is deformed due to various forces acting thereon from a direction orthogonal to the steering axis and other directions. In particular, when the stationary segment 82 is formed in an approximately trapezoid shape in section having a diameter which gradually decreases toward the frontward direction of the vehicle, to prevent a volume of the airbag storage space 81a from being excessively reduced, as shown in FIG. 4, the stationary segment 82 is likely to be more largely deformed.

If the stationary segment 82 is deformed in this manner, the concave portion 88 will also be deformed, which is likely to cause damages of the manual operation section 90 located inside the concave portion 88. Particularly, the plate-shaped touch mechanism 91 is formed in a relatively thin shape to avoid protrusion from the steering pad 8, and formed with the ornamental plate 97, the light source 98, and the receiving hole 94e for receiving the light source 98, to provide enhanced aesthetic appearance. This is likely to cause damages of the plate-shaped touch mechanism 91.

In the steering wheel assembly 5 according to the above embodiment, the manual operation section 90 is disposed in such a manner that the lateral surface of the manual operation section 90 is spaced apart from the lateral wall surface of the concave portion 88 by a distance allowing the lateral surface of the manual operation section 90 to be touch from outside. This distance can be adequately set to effectively prevent damages of the manual operation section 90, particularly, the plate-shaped touch mechanism 91, due to deformation of the stationary segment 82 during the inflation of the airbag 61.

The above steering wheel assembly 5 with the airbag module 6 is one embodiment of the present invention, and the specific structure and configuration of the embodiment may be appropriately modified without departing from the spirit and scope of the present invention. Some examples of the modification will be described below.

(1) While the manual operation section 90 in the above embodiment is designed for both the rotational and sliding operations, it may be designed to perform either one of rotational and sliding operations. Further, a specific structure for each of the operations is not limited to that of the manual operation section 90 in the above embodiment, but any other suitable conventional structure may be used.

The in-vehicle device to be controlled by the manual operation section 90 is not limited to a navigation unit, but may be an audio unit, an air-conditioning unit, an automatic-cruising apparatus for automatically controlling a vehicle speed, a distance between two vehicles or the like, an information communication apparatus for communicating with external servers to acquire various information, or the like.

Figure 10:
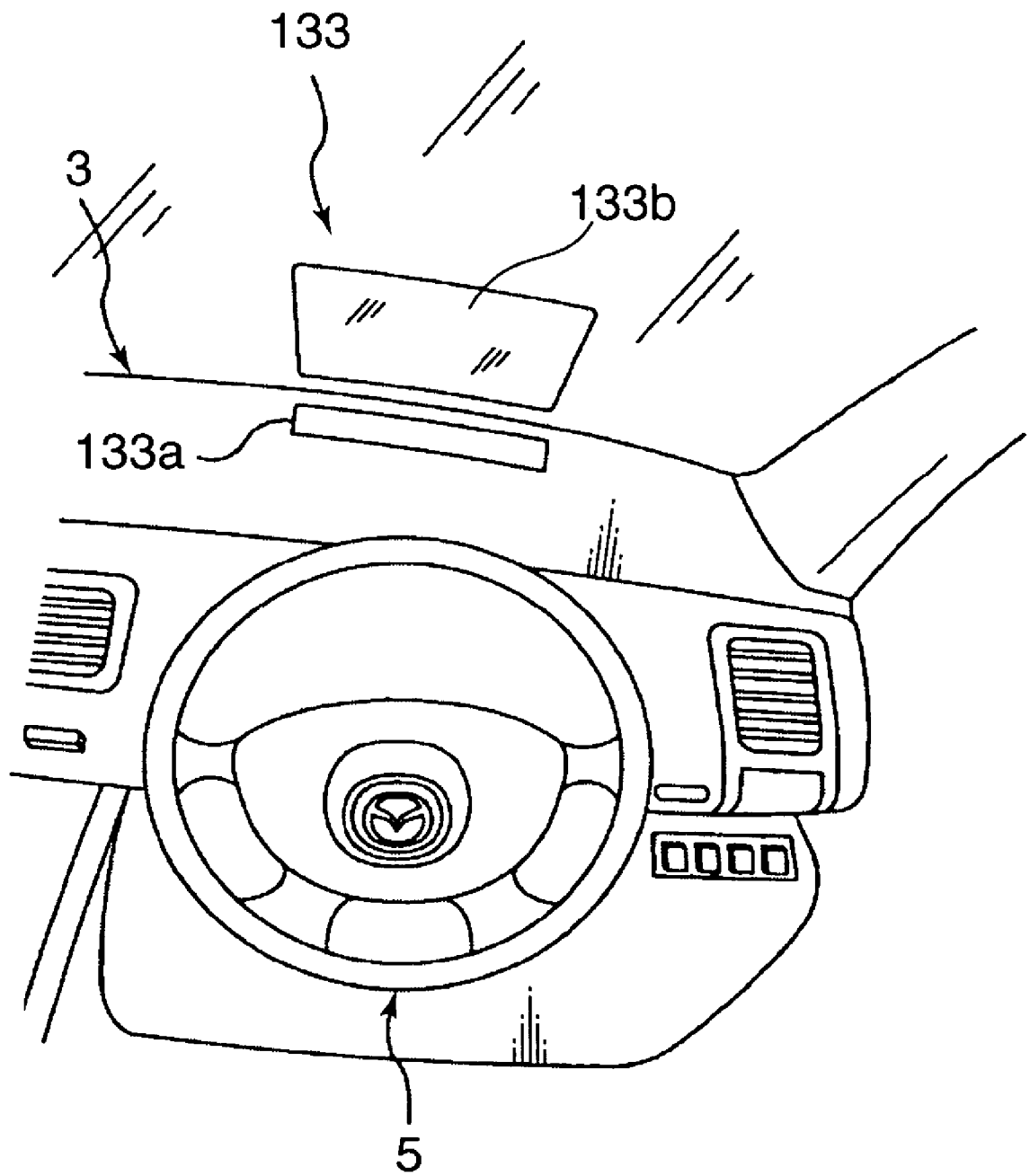
FIG. 10 is a perspective view showing another example of a display.

(2) While the display 33, such as a liquid-crystal display or CRT, in the above embodiment, is provided in the instrument panel 3, the position of the display 33 is not limited thereto. For example, as shown in FIG. 10, a display 133 may be a so-called headup display comprising a light-emitting display panel 133a for emitting light to display an information image, and a combiner 133b for reflecting the information image projected from a display surface of the light-emitting display panel 133a. In this case, a selective parameter in an information image can also be selected while recognizing outside environments.

(3) In the above embodiment, a light-emitting portion may be formed by mounting a ring-shaped optical fiber having one end associated with a light source, in a peripheral region of the bottom surface of the concave portion 88 of the stationary segment 82.

Figure 11:
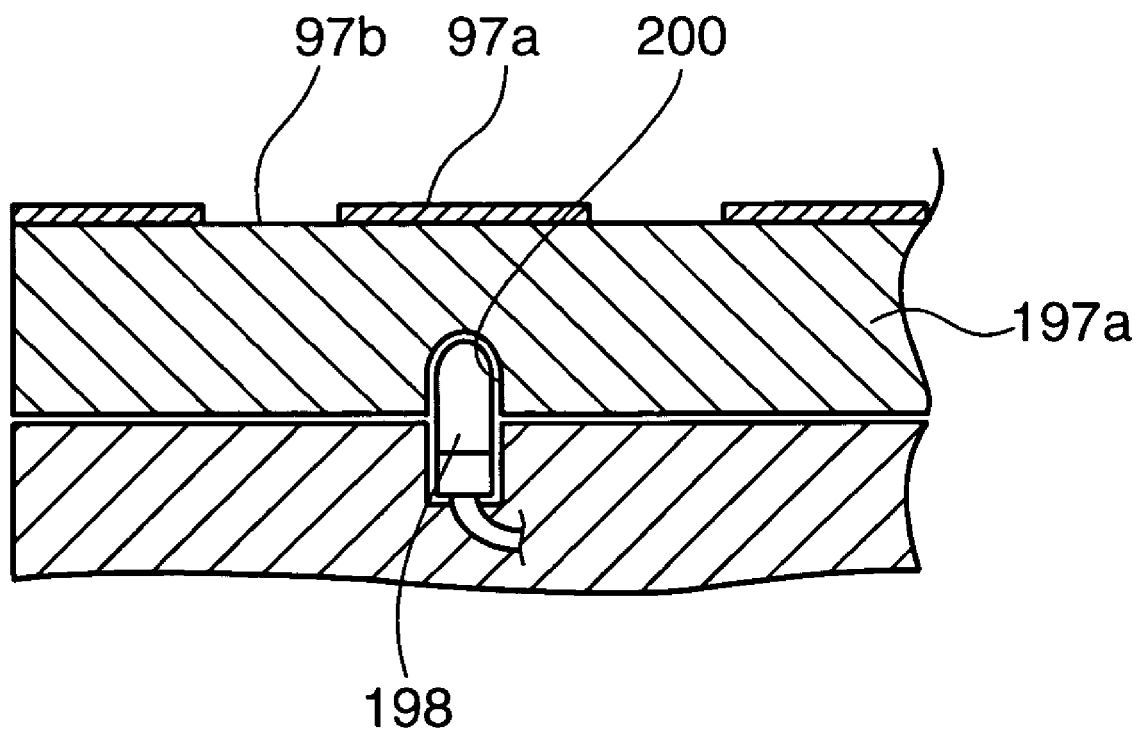
FIG. 11 is a sectional view showing another example of an illumination structure of an ornamental plate.

(4) While the illumination structure in the above embodiment is designed to indirectly illuminate the unmasked region 97b of the ornamental plate 97 by the light source 98, the illumination structure for the ornamental plate 97 is limited to a specific type. For example, as shown in FIG. 11, the illumination structure may be designed such that a clear plate 197a is attached on a push switch 94 having a surface with a bright color, and a light source 198, such as an LED, is housed in a receiving hole 200 which is formed in a back surface of the clear plate 197a corresponding to a mask element 97a attached on a front surface thereof. While the rigidity of the ornamental plate when the receiving hole 200 is formed in the ornamental plate in the above manner, the lateral surface of the plate-shaped touch mechanism 91 formed as the inclined touch surface 91a makes it possible to reduce a stress to be transmitted to the ornamental plate during the inflation of the airbag without being transmitted directly to the ornamental plate, so as to effectively suppress damages of the ornamental plate and provide enhanced aesthetic appearance.

(5) While the manual operation section 90 in the above embodiment is approximately fully received in the concave portion 88 of the stationary segment 82, the driver-facing surface of the manual operation section 90 may be designed to slightly protrude from the steering pad 8.

(6) While the concave portion 88 in the above embodiment is formed in only the stationary segment 82, the concave portion may be formed to extend from the stationary segment 82 to an inner peripheral portion of the deployment segment 81. Specifically, as indicated by the broken line 250 in FIG. 5, the deployment segment may be formed to extend up to the bottom surface of the concave portion. In this case, the concave portion will be formed to extend from the stationary segment to the deployment segment. Alternatively, the deployment segment may be designed to be broken at a position of the inclined surface of the concaved portion in the stationary segment.

(7) While the lateral surface of the plate-shaped touch mechanism 91 in the above embodiment is formed as the inclined touch surface 91a, the lateral surface may be formed as a vertical surface perpendicular to the bottom surface of the concave portion 88.

(8) When the push switch 94 is omitted, the ornamental plate 97 in the above embodiment may be provided directly on the plate-shaped touch mechanism 91.

In summary, a steering wheel assembly of the present invention comprises an airbag module having an airbag adapted to be inflated during a vehicle collision, and a centrally-located steering pad housing the airbag module. The steering pad includes a deployment segment located around a peripheral region of the steering pad and adapted to be forcibly displaced by the airbag during inflation, and a stationary segment located in a central region of the steering pad and adapted to be kept in its fixed state even during the inflation of the airbag. The stationary segment is provided with a manual operation section adapted to be manually operated based on either one of rotational and sliding movements so as to control an in-vehicle device. In this steering wheel assembly, the steering pad has a concave portion in at least a surface of the stationary segment which faces a driver seated in a driver's seat, and the manual operation section has a portion disposed within the concave portion in such a manner that a lateral surface of the manual operation section is spaced apart from a lateral wall surface of the concave portion by a distance allowing the lateral surface of the manual operation section to be touched from outside.

According to the above steering wheel assembly of the present invention, the manual operation section is designed to be manually operated based on to either one of rotational and sliding movements. Thus, without the need for moving driver's glance to a manual operation section to look for respective positions of bottoms as in the conventional touch panel, a position of the manual operation section adapted to manually control various in-vehicle devices can be figured out based on touch and feel, to allow the manual operation section to be operated while recognizing outside environments so as to provide enhanced operational performance thereto.

The above manual operation section designed to be operated rotationally and/or slidingly is likely to protrude from a portion of the steering pad therearound. In the present invention, the driver-facing surface of the stationary segment is formed with the concave portion, and the manual operation section has a portion disposed within the concave portion. This makes it possible to reduce or eliminate a protrusion of the manual operation section so as to reduce or eliminate driver's oppressed feeling, i.e., uncomfortable feeling, and to reduce or eliminate an obstructive protrusion so as to ensure a smooth steering operation.

In the above manual operation section designed to have a portion disposed within the concave portion, if the concave portion is deformed to reduce an area of the opening thereof during the inflation of the airbag, the steering pad is likely to interfere with the manual operation section and cause damages of the manual operation section. In the present invention, the manual operation section is designed to be manually operated based on either one of rotational and sliding movements, and to have a portion disposed within the concave portion in such a manner that the lateral surface of the manual operation section is spaced apart from the lateral wall surface of the concave portion by a distance allowing the lateral surface of the manual operation section to be touched from outside. This distance can be appropriately set to provide enhanced operational performance and effectively suppress damages of the manual operation section due to interference with the steering pad caused by deformation in the steering pad during the inflation of the airbag. That is, in view of the arrangement of the manual operation section allowing the driver to touch the lateral surface of the manual operation section, the lateral surface of the manual operation section and the lateral wall surface of the concave portion has to be spaced apart from each other by a sufficient distance to a deformation of the concave portion during the inflation of the airbag. This distance can be used as an allowance during deformation of the stationary segment during the inflation of the airbag so as to effectively prevent damages and deformation in the manual operation section.

In the above steering wheel assembly, as long as the distance between the lateral surface of the manual operation section and the lateral wall surface of the concave portion is set to allow the lateral surface of the manual operation section to be touched from outside, the distance is not limited to a specific value. Preferably, the distance is set at a value allowing a finger of the driver to be inserted therebetween.

According to this steering wheel assembly, a finger of the driver, i.e., a driver having a standard physique, can be inserted into a space between the lateral surface of the manual operation section and the lateral wall surface of the concave portion to provide enhanced operational performance. In addition, the lateral surface of the manual operation section and the lateral wall surface of the concave portion can be sufficiently spaced apart from each other to reliably prevent the occurrence of damages of the manual operation section.

An area of the steering pad occupied by the concave portion is not limited to a specific value. For example, the concave portion may be formed to extend from the stationary segment to the deployment segment or may be formed in a part of the driver-facing surface of the stationary segment. Preferably, the concave portion is formed in approximately an entirety of the driver-facing surface of the stationary segment.

According to this steering wheel assembly, a portion of the manual operation section disposed within the concave portion may be formed in a relatively large size. The manual operation section having a relatively large size can provide further enhanced operational performance. In addition, the concave portion kept from extending to the deployment segment makes it possible to ensure a sufficient storage space for the airbag module so as to avoid adverse effects on deployment of the airbag.

The in-vehicle device to be controlled by the manual operation section is not limited to a specific type. As an example, the in-vehicle device may be a navigation unit, an audio unit, an air-conditioning unit, an automatic-cruising apparatus for automatically controlling a vehicle speed, a distance between two vehicles or the like, or an information communication apparatus for communicating with external servers to acquire various information. In either case, preferably, the manual operation section is adapted to selectively control a selective parameter indicated on a display provided on at least either one of an instrument panel and a front windshield.

According to this steering wheel assembly, the selective control of a selective parameter indicated on a display can be performed by the manual operation section, to achieve controllability of the selective parameter. In addition, the selective control of a selective parameter indicated on a display provided on at least either one of an instrument panel and a front windshield can be manually performed using the manual operation section, and driver's glance is moved upward differently from the conventional touch panel. This makes it possible to perform the selective operations while recognizing outside environments so as to provide enhanced user-friendliness.

In the present invention, preferably, the deployment segment has an airbag storage space for store therein the airbag, and the airbag storage space extends up to a frontward edge of the stationary segment.

According to this steering wheel assembly, the airbag can be efficiently housed in the airbag storage space to allow the steering pad to be formed in a compact size while maintaining adequate airbag storing performance.

In the present invention, preferably, the manual operation section includes an ornamental member disposed on a surface thereof which faces the driver.

According to this steering wheel assembly, the manual operation section can have enhanced aesthetic appearance. In addition, the manual operation section protected from damages can effectively prevent damages of the ornamental member provided on the manual operation section.

Preferably, the ornamental member has a translucency, and the manual operation section further includes an illumination device for illuminating a passenger compartment through the ornamental member. In this case, the ornamental member is preferably formed with a receiving hole for receiving therein the illumination device.

According to the steering wheel assembly, an ornamental effect of the ornamental member can be further enhanced. In addition, the position of the manual operation section can be reliably figured out even at nighttime to provide further enhanced operational performance. While this structure is generally likely to cause damages of an ornamental member due to an external force, the ornamental member is effectively protected from damages as described above. Thus, with a view to providing enhanced aesthetic appearance, the structure where the illumination means is received in the receiving hole formed in the ornamental member can be used.

In the present invention, the driver-facing surface of the manual operation section may be arranged to become slightly higher or lower than the driver-facing surface of the steering pad. Preferably, respective dimensions of the steering pad and the manual operation section are set to allow a topmost portion of the driver-facing surface of the steering pad to be approximately flush with a surface of the manual operation section which faces the driver.

According to this steering wheel assembly, the steering wheel assembly can have enhanced aesthetic appearance while maintaining excellent operational performance, and the steering operation can be further smoothly performed.

In the present invention, the portion of the manual operation section is disposed within the concave portion in such a manner that the lateral surface of the manual operation section is spaced apart from the lateral wall surface of the concave portion by a distance allowing the lateral surface of the manual operation section to avoid contact with the lateral wall surface of the concave portion during the inflation of the airbag.

The manual operation section having a portion disposed within the concave portion is generally likely to cause damages of the manual operation section, particularly, the ornamental member disposed in the manual operation section, during the inflation of the airbag. In the present invention, the lateral surface of the manual operation section is disposed spaced apart from the lateral wall surface of the concave portion by a distance allowing the lateral surface of the manual operation section to avoid contact with the lateral wall surface of the concave portion during the inflation of the airbag. Thus, the distance can be appropriately set to effectively prevent damages of the manual operation section and the ornamental member due to deformation of the stationary segment during the inflation of the airbag. This allows a damageable ornamental member to be arranged on the manual operation section so as to provide enhanced aesthetic appearance to the steering wheel assembly based on the ornamental member.

In the present invention, preferably, the manual operation section includes a plate-shaped touch mechanism which is disposed to have one surface facing the driver and adapted to be touched by the driver in connection with each of the movements. The plate-shaped touch mechanism has a lateral surface formed as an inclined touch surface which is inclined inward toward the driver-facing surface thereof.

In view of figuring out the position of the manual operation section by touch and feel as described above, it is desirable to form the manual operation section in a relatively large size. According to this steering wheel assembly, the manual operation section has the plate-shaped touch mechanism which is disposed to have one surface facing the driver and adapted to be touched by the driver in connection with each of the movements. Thus, the portion to be touched by the driver can be formed in a relatively large size as compared with a rod-shaped portion. This makes it possible to readily figure out the position of the manual operation section. In addition, the manual operation section having the relatively large plate-shaped touch mechanism allows a driver gripping the steering ring to touch the plate-shaped touch mechanism without largely stretching his/her hand. This can provide enhanced operational performance to the manual operation section.

During the rotational and sliding operations of the manual operation section, it is desirable to touch and operate the manual operation section from the side along the rotation axis and the sliding axis, i.e., the lateral surface of the plate-shaped touch mechanism. However, if the manual operation section is arranged to largely protrude from the stationary segment, it will give oppressed feeling, i.e., uncomfortable feeling, to the driver, and hinder a steering operation. Thus, it is desirable to minimize the protrusion. If the protrusion is reduced, an area of the lateral surface of the plate-shaped touch mechanism is reduced, which is likely to cause deterioration in operational performance. In the steering wheel assembly of the present invention, the lateral surface of the plate-shaped touch mechanism is formed as the inclined touch surface which is inclined inward toward the driver-facing surface of the plate-shaped touch mechanism. This makes it possible to suppress the protrusion of the plate-shaped touch mechanism and ensure an adequate touch area based on the plate-shaped touch mechanism and ensure so as to suppress driver's oppressed feeling and ensure adequate steering operation and operational performance of the manual operation section.

Preferably, at least a portion of the plate-shaped touch mechanism is disposed within the concave portion formed in the stationary segment. More preferably, an entirety of the plate-shaped touch mechanism is disposed within the concave portion.

According to this steering wheel assembly, the concave portion can reduce or eliminate the protrusion of the plate-shaped touch mechanism to further suppress driver's oppressed feeling and ensure an adequate steering operation. In addition, even if the plate-shaped touch mechanism is disposed within the concave portion, the lateral surface of the plate-shaped touch mechanism formed as the inclined touch surface can be smoothly operated without deterioration in operational performance. In the plate-shaped touch mechanism disposed within the concave portion of the stationary segment, if the concave portion is deformed to reduce an area of the opening thereof during the inflation of the airbag, a stress also acts on the plate-shaped touch mechanism, which is likely to cause damages of the plate-shaped touch mechanism. According to the above steering wheel assembly, the lateral surface of the plate-shaped touch mechanism formed as the inclined touch surface makes it possible to suppress a contact between the lateral wall surface of the concave portion and the lateral surface of the plate-shaped touch mechanism, due to the inflation of the airbag, so as to effectively prevent damages of the plate-shaped touch mechanism.

The concave portion of the stationary segment is not limited to a specific shape, but may have a shape having a lateral wall surface extending upward and perpendicularly to a bottom surface. Preferably, the lateral wall surface of the concave portion of the stationary segment is formed as an inclined surface which is inclined outward toward an opening edge of the concave portion This steering wheel assembly makes it possible to further effectively prevent the damage of the plate-shaped touch mechanism during the inflation of the airbag, and allow the position of the plate-shaped touch mechanism to be further readily figured out.

In the present invention, preferably, the steering pad includes a horn switch adapted to be moved along a steering axis and then turned on, according to a pushing operation, and the plate-shaped touch mechanism includes a switch which is disposed in an inside region relative to the driver-facing surface thereof, and adapted to moved along the steering axis and then turned on, according to a pushing operation. Further, the switch is formed such that a surface thereof facing the driver has an area less than that of a palm of the driver, and disposed to be approximately flush with or depressed relative to the driver-facing surface of the plate-shaped touch mechanism.

According to this steering wheel assembly, the plate-shaped touch mechanism includes a switch which is disposed in an inside region relative to the driver-facing surface thereof, and adapted to moved along the steering axis and then turned on, according to a pushing operation. Thus, the manual operational function of the manual operation section can be expanded, and the increased manual operation modes in the manual operation section can be variously combined with each other to perform a plurality of manual operations. Generally, a conventional steering pad includes a horn switch adapted to be turned on according to a push operation. The above switch provided in the plate-shaped touch mechanism is likely to cause an undesirable situation where, during an operation of turning on the horn switch, the above switch is erroneously pushed. In the above steering wheel assembly, the switch is formed such that a surface thereof facing the driver has an area less than that of a palm of the driver, and disposed to be approximately flush with or depressed relative to the driver-facing surface of the plate-shaped touch mechanism. This makes it possible to suppress an undesirable situation where, during the horn switch turning-on operation which is performed by a push operation using driver's palm in many cases, the above switch is erroneously pushed, or maximally suppress maximally suppress an erroneous operation of the switch such that, despite driver's intention of performing the horn switch turning-on operation, the above switch is erroneously turned on to preclude the intended horn switch turning-on operation from being adequately performed.

In the present invention, preferably, the steering pad includes a horn switch adapted to be moved along a steering axis and then turned on, according to a pushing operation, and the manual operation section includes a plate-shaped touch mechanism which is disposed to have one surface facing the driver. The plate-shaped touch mechanism has a switch which is disposed in an inside region relative to the driver-facing surface thereof, and adapted to moved along the steering axis and then turned on, according to a pushing operation. Further, the switch is formed such that a surface thereof facing the driver has an area less than that of a palm of the driver, and disposed to be approximately flush with or depressed relative to the driver-facing surface of the plate-shaped touch mechanism.

According to this steering wheel assembly, the manual operation section includes a plate-shaped touch mechanism which is disposed to have one surface facing the driver, and the plate-shaped touch mechanism includes a switch which is disposed in an inside region relative to the driver-facing surface thereof, and adapted to moved along the steering axis and then turned on, according to a pushing operation. This makes it possible to figure out the position of the plate-shaped touch mechanism by touch and feel so as to perform the pushing operation of the switch, and perform the operation of the manual operation section while recognizing outside environments, so as to provide enhanced operational performance. For example, the plate-shaped touch mechanism itself may be designed to have functions of rotational, sliding and push operations to increase the number of manual operation modes.

Generally, a conventional steering pad includes a horn switch adapted to be turned on according to a push operation. The above switch provided in the plate-shaped touch mechanism is likely to cause an undesirable situation where, during an operation of turning on the horn switch, the above switch is erroneously pushed. In the above steering wheel assembly, the switch is formed such that a surface thereof facing the driver has an area less than that of a palm of the driver, and disposed to be approximately flush with or depressed relative to the driver-facing surface of the plate-shaped touch mechanism. This makes it possible to suppress an undesirable situation where, during the horn switch turning-on operation which is performed by a push operation using driver's palm in many cases, the above switch is erroneously pushed, or maximally suppress maximally suppress an erroneous operation of the switch such that, despite driver's intention of performing the horn switch turning-on operation, the above switch is erroneously turned on to preclude the intended horn switch turning-on operation from being adequately performed.

This application is based on Japanese Patent Application Nos. 2005-352198 and 2005-352199, filed in Japan Patent Office, both on Dec. 6, 2005, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A steering wheel assembly comprising:
an airbag module having an airbag adapted to be inflated during a vehicle collision; and
a centrally-located steering pad which houses said airbag module and said steering pad includes:
a deployment segment located around a peripheral region of said steering pad and adapted to be forcibly displaced by the inflation of said airbag; and
a stationary segment located in a central region of said steering pad and adapted to be kept in its fixed state even during the inflation of said airbag, said stationary segment being provided with a manual operation section adapted to be manually operated based on either one of rotational and sliding movements so as to control an in-vehicle device,
wherein:
said deployment segment is placed around said stationary segment and said deployment segment has an inner edge which is displaceable from its ordinary state upon inflation of the airbag;
said steering pad has a concave portion in at least a driver facing surface of said stationary segment
said manual operation section is disposed within said concave portion in such a manner that a lateral surface of said manual operation section is spaced apart from a lateral wall surface of said concave portion by a distance allowing the lateral surface of said manual operation section to be touched from driver's side; and
the lateral surface of said manual operation section is spaced apart from the inner edge of the deployment segment.

2. The steering wheel assembly as defined in claim 1, wherein said distance between the lateral surface of said manual operation section and the lateral wall surface of said concave portion is set at a value allowing a finger of the driver to be inserted therebetween.

3. The steering wheel assembly as defined in claim 1, wherein said concave portion is formed in approximately an entirety of said driver-facing surface of said stationary segment.

4. The steering wheel assembly as defined in claim 1, wherein said manual operation section is adapted to selectively control a selective parameter indicated on a display provided on at least either one of an instrument panel and a front windshield.

5. The steering wheel assembly as defined in claim 1, wherein said deployment segment has an airbag storage space for store therein said airbag, said airbag storage space extending up to a frontward edge of said stationary segment.

6. The steering wheel assembly as defined in claim 1, wherein said manual operation section includes an ornamental member disposed on a surface thereof which faces the driver.

7. The steering wheel assembly as defined in claim 6, wherein said ornamental member has a translucency, wherein said manual operation section further includes an illumination device for illuminating a passenger compartment through said ornamental member.

8. The steering wheel assembly as defined in claim 7, wherein said ornamental member is formed with a receiving hole for receiving therein said illumination device.

9. The steering wheel assembly as defined in claim 1, wherein respective dimensions of said steering pad and said manual operation section are set to allow a topmost portion of said driver-facing surface of said steering pad to be approximately flush with a surface of said manual operation section which faces the driver.

10. The steering wheel assembly as defined in claim 7, wherein the portion of said manual operation section is disposed within said concave portion in such a manner that the lateral surface of said manual operation section is spaced apart from the lateral wall surface of said concave portion by a distance allowing the lateral surface of said manual operation section to avoid contact with the lateral wall surface of said concave portion during the inflation of said airbag.

11. The steering wheel assembly as defined in claim 1, wherein said manual operation section includes a plate-shaped touch mechanism which is disposed to have one surface facing the driver and adapted to be touched by the driver in connection with each of said movements, said plate-shaped touch mechanism having a lateral surface formed as an inclined touch surface which is inclined inward toward said driver-facing surface thereof.

12. The steering wheel assembly as defined in claim 11, wherein at least a portion of said plate-shaped touch mechanism is disposed within the concave portion formed in said stationary segment.

13. The steering wheel assembly as defined in claim 12, wherein an entirety of said plate-shaped touch mechanism is disposed within said concave portion.

14. The steering wheel assembly as defined in claim 12, wherein the lateral wall surface of the concave portion of said stationary segment is formed as an inclined surface which is inclined outward toward an opening edge of said the concave portion.

15. The steering wheel assembly as defined in claim 11, wherein:
said steering pad includes a horn switch adapted to be moved along a steering axis and then turned on, according to a pushing operation;
said plate-shaped touch mechanism includes a switch which is disposed in an inside region relative to said driver-facing surface thereof, and adapted to moved along the steering axis and then turned on, according to a pushing operation, said switch being formed such that a surface thereof facing the driver has an area less than that of a palm of the driver, and disposed to be approximately flush with or depressed relative to the driver-facing surface of said plate-shaped touch mechanism.

16. The steering wheel assembly as defined in claim 1, wherein:
said steering pad includes a horn switch adapted to be moved along a steering axis and then turned on, according to a pushing operation;
said manual operation section includes a plate-shaped touch mechanism which is disposed to have one surface facing the driver, said plate-shaped touch mechanism having a switch which is disposed in an inside region relative to said driver-facing surface thereof, and adapted to moved along the steering axis and then turned on, according to a pushing operation, said switch being formed such that a surface thereof facing the driver has an area less than that of a palm of the driver, and disposed to be approximately flush with or depressed relative to the driver-facing surface of said plate-shaped touch mechanism.

17. The steering wheel assembly as defined in claim 1, wherein said stationary segment has a flat surface in the middle and annular shaped laterally inclining surface extending from the periphery of the flat surface to form said concave portion and a part of said flat surface is disposed between said manual operation section and the inner edge of said deployment section viewing from the axial direction of the steering wheel.

18. The steering wheel assembly as defined in claim 1, wherein said inner edge of the deployment segment includes a hook-like engaging portion and said stationary segment has an external engagement flange; and said hook-like engaging portion and said external engagement flange are in engagement state in such a manner that the hook-like engaging portion is underneath said external engagement flange in an axial direction of the steering wheel.

19. The steering wheel assembly as defined in claim 1, wherein said manual operation section has a plate-shaped touch portion adapted to be touched by the driver, said plate-shaped touch portion is manually displaceable to control an in-vehicle device in accordance with a sliding movement of the plate-shaped touch portion in its entirety on a driver-facing plane by the driver from the original portion thereof in substantially a central position in the concave portion.

20. A steering wheel assembly comprising:
an airbag module having an airbag adapted to be inflated during a vehicle collision; and
centrally-located steering pad which houses said airbag module and includes:
a deployment segment located around a peripheral region of said steering pad and adapted to be forcibly displaced by said airbag during inflation; and
a stationary segment located in a central region of said steering pad and adapted to be kept in its fixed state even during the inflation of said airbag, said stationary segment being provided with a manual operation section,
wherein:
said steering pad has a concave portion in at least a surface of said stationary segment which faces a driver seated in a driver's seat;
said manual operation section has a portion disposed within said concave portion in such a manner that a lateral surface of said manual operation section is spaced apart from a lateral wall surface of said concave portion by a distance allowing the lateral surface of said manual operation section to be touched from outside;
said manual operation section has a plate-shaped touch portion adapted to be touched by the driver; and
said plate-shaped touch portion is manually displaceable to control an in-vehicle device in accordance with a shifting movement of the plate-shaped touch portion in its entirety on a driver-facing plane by the driver from the original position thereof in substantially a central position in the concave portion.

21. The steering wheel assembly as defined in claim 20, wherein said manual operation section has an operation shaft which extends from the bottom and the central region of said plate-shaped touch portion along the axis of the steering wheel; and said operation shaft is biased towards the driver side along the axis of the steering wheel in such a manner that the rear surface of the plate-shaped touch portion is free from contact with the concave portion of the stationary segment.

22. A steering wheel assembly comprising:
an airbag module having an airbag adapted to be inflated during a vehicle collision; and
a centrally-located steering pad which houses said airbag module and includes:
a deployment segment located around a peripheral region of said steering pad and adapted to be forcibly displaced by said airbag during inflation;
a stationary segment located in a central region of said steering pad and adapted to be kept in its fixed state even during the inflation of said airbag, said stationary segment being provided with a manual operation section to control an in-vehicle device; and
a horn switch adapted to be moved along a steering axis and then turned on, according to a pushing operation by a driver;
wherein:
said steering pad has a concave portion in at least a driver facing surface of said stationary segment; and
said manual operation section is disposed within said concave portion in such a manner that a lateral surface of said manual operation section is spaced apart from a lateral wall surface of said concave portion by a distance allowing the lateral surface of said manual operation section to be touched from driver's side; and
said manual operation section is adapted to be manually operated based on at least one of rotational and sliding movements of the manual operation section relative to its position within said concave portion by application of an external force by the driver upon the lateral surface of the manual section.

23. The steering wheel assembly as defined in claim 1, wherein said manual operation section has a manually depressible push switch and a manually rotatable dial switch.

24. The steering wheel assembly as defined in claim 20, wherein said manual operation section has a manually depressible push switch and a manually rotatable dial switch.

25. The steering wheel assembly as defined in claim 22, wherein said manual operation section has a manually depressible push switch and a manually rotatable dial switch.

26. The steering wheel assembly as defined in claim 11, wherein said manual operation section has a manually depressible push switch and manually rotatable dial switch and said plate-shaped touch mechanism is formed with a push switch receiving depression in the middle section thereof, viewing from a driver, to receive the manually depressible push switch and is formed with an annular depression around a peripheral area thereof to receive said manually rotatable dial switch.

27. The steering wheel assembly as defined in claim 11, wherein said manual operation section has a manually depressible push switch having a substantially flat driver-facing surface which is approximately flush with or depressed relative to the driver-facing surface of the plate-shaped touch mechanism.

* * * * *